United States Patent Office

2,941,899
Patented June 21, 1960

2,941,899

HIGH TEMPERATURE GLASS FIBER INSULATION PRODUCTS AND METHOD FOR MANUFACTURING SAME

Joseph P. Stalego, Newark, Ohio, assignor to Owens-Corning Fiberglas Corporation, a corporation of Delaware No Drawing. Filed Dec. 27, 1954, Ser. No. 477,940

19 Claims. (Cl. 117—46)

This invention relates to bonded glass fiber insulation products and it relates more particularly to a product formed of glass fibers or other inorganic insulating fibers, such as asbestos, rock wool or the like, bonded with an organic resinous material into an insulation product of predetermined shape and density such as may be molded in forming as a pipe wrap or the like and in which the insulation product is treated to enable use at temperatures in excess of 500° F. without punking and to enable exposures in use to temperatures up to the fusion temperature for the glass composition of which the fibers are formed without deterioration of the insulation product.

As used herein, the term "glass fibers" is intended to refer chiefly to staple glass fibers which are formed as by the process described in the Tucker et al. Patent No. 2,264,345, issued December 2, 1941, in which a plurality of molten streams of glass issuing from a bushing at the base of a glass melting furnace are attenuated by continuous blasts of high pressure steam or air directed angularly downwardly onto the streams for attenuation thereby to form fibers of small dimension. Such glass wool fibers may also be formed to even smaller dimension by the use of gas burners for reducing rods of glass to a molten state followed by attenuation. The attenuated fibers are allowed to fall downwardly by gravity through a forming hood for collection as a mat on the upper surface of an endless belt moving in one direction. The thickness of the mat that is formed on the collecting surface can be varied depending upon the linear speed of the belt or the rate of fiber formation. While the term "glass fibers" refers chiefly to staple fibers, use may also be made of continuous fibers alone but preferably in combinations with staple fibers in which the continuous fibers are cut or chopped into smaller lengths for interfelting in the manufacture of the fibrous structures.

The term "glass fibers" is intended also to include other fibrous elements formed of inorganic ceramic material, such as asbestos, rock wool and the like. While the major portion of the bonded or molded insulation products are formed of continuous webs or mats prepared in the manner described, this invention is intended to include fibrous insulation products molded to predetermined shapes as by the use of separating screens or the like and it is also intended to include glass fiber insulation products formed of continuous fibers alone or combinations of continuous and staple fibers in which the continuous fibers are deposited in swirl patterns in overlapping relation to form a fibrous structure having strength characteristics extending in all directions.

In practically all of the various types of fibrous structures described, use is preferably made of a thermosetting binder alone but preferably in combination with an incompatible oil to secure the fibers one to another in the manufacture of a bonded structure in which the density of the porous insulation product may vary from 1 pound per cubic foot up to 12 pounds or more per cubic foot and in which the resinous binder concentration may range from ½ percent by weight of the insulation product up to 2½ percent by weight for the low density materials and up to 12–15 or 20 percent by weight for the higher density insulation products and for molding products. The various binders may be applied from an aqueous system onto the glass fibers as they become felted on the collecting surface or the resinous binder may be applied afterwards by means of a spray or a flow-coat or saturation process. Reference may be made to the Bergin et al. Patents Nos. 2,252,157, 2,351,802 and 2,335,102 for bonded glass fiber structures which may be employed in the practice of this invention.

For most part, use is made of a phenol-formaldehyde resin as the resinous binder component used in combinations with glass fibers in the manufacture of insulation products. When applied to the staple glass fibers which are rained down from above for deposition in interfelted relation onto a collecting surface, use is also made of a small amount of an incompatible oil to lubricate the fibers and cause the aqueous resinous binder composition to migrate to the fiber intersections where more efficient use can be made of the resinous binder for securing the fibers one to another. Instead of a phenol-formaldehyde resin, use may be made of a Vinsol modified phenol-formaldehyde resin, cresol-formaldehyde resin, resorcinol-formaldehyde resin, and modifications of phenol aldehyde resins with flexibilizing agents such as butadiene-acrylonitrile copolymers and the like. In more expensive insulations, where light color is required and which may be used as a surface paneling for insulation, the resinous binder may be formed of urea-formaldehyde, melamine-formaldehyde, methylated diurea-urea-formaldehyde resins and the like in the manufacture of porous molded products, such as insulation panels, molded insulations and the like. Such insulation products formed of glass fibers bonded with phenol-formaldehyde resin and the like organic resinous materials are limited in use to applications wherein temperatures will not exceed 300–450° F. because thermal decomposition of the resinous binder begins to occur at temperatures of about 350° F. and the decomposition rate proceeds more rapidly at higher temperatures with the danger of causing punking of the resin when the temperature exceeds 425° F. The limitations in the use of glass fibers and the like as a high temperature insulation material are imposed by the decomposition temperature of the binder composition. While the glass fibers are, by themselves, capable of use for insulation purposes at temperatures as high as 1200° F., they are limited by the binder system to markedly lower temperatures.

Many of the more recent technical advances made in the electrical and in the processing fields require the use of high temperature insulation materials and it is desirable, therefore, to have available a glass fiber insulation which is capable of use at such higher temperatures, preferably up to the temperature of fusion of the glass composition of which the fibers are formed.

Numerous attempts have been made to employ inorganic binders with glass fibers which would not be subject to thermal decomposition at such temperatures as low as 400–450° F. but such inorganic systems have been found undesirable from the standpoint of application, the amount of binder required to give the desired results, from the standpoint of the inflexibility of the inorganic bonded insulation product and from the standpoint of the loss in strength and porosity of the insulation, and the difficulty in controlling the cure of such inorganic binder materials.

It is an object of this invention to produce and to provide a method of producing glass fiber insulation products which are capable of use at temperatures in excess of 450° F. without punking or deterioration and which embody all of the desirable characteristics now present in the corresponding resinous bonded insulation products; which is not subject to the objectionable characteristics inherent in the use of an inorganic binder system such as the sodium silicates or cements; which is capable of being produced in a simple and efficient manner, and which cures rapidly to form a product embodying the flexibility of the inorganic binder systems; and which produces a low cost insulation capable of use at high temperatures of at least 700° F. without punking and up to about 1200° F. without deterioration.

Briefly described, an improved bonded glass fiber product embodying the features of this invention has been produced by the treatment of a porous glass fiber structure bonded with organic resinous materials of the type generally employed but in which the bonded glass fibers are substantially treated with a composition that functions in a dual capacity of increasing the temperature at which thermal break-down occurs, which prevents punking at temperatures considerably higher than 400–500° F. and which is capable of reaction to form a binder system to replace the original organic binder in the event of the elimination thereof by volatilization or decomposition at elevated temperatures.

By way of illustration, but not by way of limitation, description will hereafter be made of the practice of this invention in the manufacture of a high temperature glass wool fiber insulation product by treatment of a porous glass fiber insulation bonded with phenol-formaldehyde resin and advanced in manufacture to a cured and set stage. It will be understood that the concepts of this invention are not to be limited by the amount of binder in the porous insulation base or in the type of inorganic resinous binder, or in the shape, density or construction of the porous glass fiber insulation product other than the fact that the pores of the insulation should be sufficiently communicative to permit penetration of the porous glass fiber base with the hereafter described treating composition.

*Example 1*

Treating composition:

1 part by weight kaolin clay
1 part by weight silicic acid
1 part by weight of a urea-borate-glycol condensation reaction product The above materials are combined in the desired ratio in aqueous medium in amounts to provide 17–22 percent by weight solids. The kaolin clay, which is insoluble in aqueous medium, is dispersed with the silicic acid and combined with the partially soluble urea-borate condensation product in water to form a stable mixture in which some agitation is desired to maintain the desired uniformity of the distribution of the materials.

Procedure: The phenol-formaldehyde resinous bonded, porous glass fiber base is saturated with the composition of Example 1, as by means of a weir application, substantially completely to wet out the resinous bonded fibers throughout the interior and the exterior of the bonded product. The treating composition is allowed to drain from the base. Where more rapid and complete drainage is desired, suction means may be employed, such as by the application of a vacuum to the underside of the base, but it is desirable to permit sufficient of the treating composition to remain in the base to provide a coating weight of about 15–35 percent based upon the weight of the final product.

The treating composition may be allowed to air dry but it is preferred to bake the product at elevated temperatures for reaction of the silicic acid with the organic borate which forms an inorganic binder. For this purpose, temperatures in excess of 400° F. up to 700° F. may be employed for a time depending greatly on the density and thickness of the base and the ability to eliminate water from the treating composition in the interior thereof. With a base averaging about 1–3 inches in thickness and a density of about 3–12 pounds per square foot, baking for 15–60 minutes at 600° F. should be sufficient.

When treated in the manner described, the insulation product can be subjected over extended periods of time to temperatures of 600–700° F. or more without punking as distinguished from the requirement not to exceed 400° F. with the insulation base prior to treatment. Without treatment in the manner described, the phenol-formaldehyde resinous binder would be eliminated upon extended exposure to temperatures in excess of 350° F. and the elimination of the binder would take place almost immediately when exposed to temperatures in the order of 900–1000° F. Such elimination or deterioration of the binder composition would result in the destruction of the insulation product as a pipe wrap or as a molded product. On the other hand, when the bonded glass fiber insulation has been treated in the manner described, the insulation product can be employed under temperature conditions exceeding 1000° F. without becoming unfit for use. While the original phenol-formaldehyde resinous binder will be eliminated under such temperature conditions, the materials applied as a coating to the bonded glass fibers, in accordance with the practice of this invention, will produce a binder which will be capable of functioning in replacement of the original phenol-formaldehyde resin for preventing deterioration of the molded insulation product.

The solids content of the treating composition is not the controlling factor and can be varied over a fairly wide range. The important consideration is the amount of solids supplied by the treating composition preferably in uniform distribution throughout the porous base. When less than 15 percent by weight of the treating composition remains in the base, the desired results with respect to non-punking at temperatures of 600–700° F. and the desired bonding relation upon elimination of the organic binder is not satisfactorily developed. The bonding relation is more or less proportional to the amount of treating composition which remains in the porous glass fiber base. From the standpoint of economy and from the standpoint of utility, it is undesirable to introduce more than 35 percent by weight of the treating composition based upon the weight of solids into the glass fiber insulation product. Best results are secured with a retention of between 20–35 percent by weight.

The kaolin clay functions in the treating composition primarily as a filler to reduce the cost and to improve filming characteristics of silicic acid. Instead of kaolin clay, use may be made of finely divided silica, silicates, clay, bentonite, diatomaceous earth, metal oxides and carbonates, or other thermally stable finely divided inorganic materials. Such fillers can be used in amounts ranging from 1–4 parts by weight filler to 1 part by weight of silicic acid. Best results are secured when the filler is present in an amount ranging from 1½–2 parts by weight of filler to 1 part by weight of silicic acid.

When cost is not a factor, the treating composition may be formulated without such fillers. When formed with or without fillers, the amount of silicic acid and organic borate should be maintained within the ratio of 0.1–1.0 part by weight of the organic borate to 1 part by weight silicic acid. The development of an improved inorganic bond results from the use of such materials within the range of 0.1–0.5 part by weight of organic borate to 1 part by weight silicic acid.

The presence of organic borate in increasing amounts results in improved resistance to punking. As used herein, the term "organic borate" is intended to include the condensation reaction product of urea, boric acid and a polyhydric alcohol, such as glycol, in substantially equimolecular amounts. Representative of organic borates which may be used in the practice of this invention are the materials marketed by Booty Resineers under the designation "Tybon 1016B" and the like.

Further examples of compositions which may be employed in the practice of this invention are as follows:

Example 2

0.4 part by weight organic borate (Tybon 1016B-condensation product of urea, boric acid, and glycol)
1.0 part by weight silicic acid
Water in amounts to produce a mixture having 20 percent solids

Example 3

41 parts by weight silicic acid
18 parts by weight urea borate (condensation product of urea, boric acid and glycol)
41 parts by weight of Canary clay
Water in amounts to produce a mixture having 25 percent solids

Example 4

1½–4 parts by weight filler
1 part by weight silicic acid
0.2–1.0 part by weight organic borate (urea, boric acid, and glycol)

A preferred formulation for high temperature insulation may be formulated as follows:

Example 5

1½–2 parts by weight siliceous filler in finely divided form
1 part by weight silicic acid
0.2–0.5 part by weight organic borate (Tybon 1016B)
Water in amounts to provide a composition having 20–35 percent by weight solids Instead of applying the treating composition by a weir for saturation, the porous glass fiber base may be treated by flooding the base with the coating composition, by immersing the base into a bath of the composition, or by the use of alternating pressures and vacuums to secure substantially complete impregnation or by other conventional impregnating means.

Structures produced in accordance with the practice of this invention have been used successfully as molded pipe insulation for high pressure steam and molded insulation for many other applications where temperatures as high as 1200° F. are encountered. As previously pointed out, it is believed that the silicic acid and organic borate alone and preferably in combination with kaolin clay, or other siliceous or clay fillers, react during cure and at temperatures which cause break-down of the organic binder (in excess of 500° F.) to form an inorganic binder capable of holding the fibers together in the original bonded relation and which protects the organic binder present to enable exposure to temperatures as high as 700° F. or better without punking.

This application is a continuation-in-part of my copending application Ser. No. 406,591, filed on January 27, 1954.

It will be understood that changes may be made in the details of the formulations, the methods of application, and treatment of the organic resinous bonded insulation products without departing from the spirit of the invention, especially as defined in the following claims.

I claim:

1. The method of producing a thermally stable porous base of glass fibers bonded with organic resinous material comprising impregnating the organic resinous bonded porous base with a composition in which the solids remaining on the bonded glass fibers comprise silicic acid and an organic borate, and heating the material at a temperature sufficient for reaction to form an inorganic binder.

2. In the method of producing a thermally stable porous base of inorganic fibers bonded with an organic resinous material comprising impregnating the porous base with a composition the solids of which comprise silicic acid and the condensation reaction product of urea, boric acid and a polyhydric alcohol.

3. In the method of producing a thermally stable porous base of inorganic fibers bonded with an organic resinous material comprising impregnating the porous base with a composition the solids of which comprise silicic acid and the condensation reaction product of urea, acid and a polyhdric alcohol, and in which the materials are present in the ratio of 1 part by weight silicic acid to 0.1–1.0 part by weight of the organic borate condensation product.

4. The method as claimed in claim 3 in which the amount of solids remaining in the porous base is in excess of 15 percent by weight of the finished product.

5. The method of treating a porous base of glass fibers bonded with organic resinous materials for use in the manufacture of high temperature glass fiber insulation comprising impregnating the porous base with a composition the solids of which comprise a siliceous filler in finely divided form, silicic acid and an organic borate.

6. The method of treating a porous base of glass fibers bonded with organic resinous materials for use in the manufacture of high temperature glass fiber insulation comprising impregnating the porous base with a composition the solids of which comprise a siliceous filler in finely divided form, silicic acid, and the condensation reaction product of urea, boric acid and a polyhydric alcohol.

7. The method of treating a porous base of glass fibers bonded with organic resinous materials for use in the manufacture of high temperature glass fiber insulation comprising impregnating the porous base with a composition the solids of which comprise a siliceous filler in finely divided form, silicic acid and the condensation reaction product of urea, boric acid and a polyhydric alcohol, in which the materials are present in the ratio of 1–4 parts by weight siliceous filler, 1 part by weight silicic acid and 0.1–1.0 part by weight of the organic borate.

8. The method as claimed in claim 6 in which the treating composition is incorporated in amounts to deposit at least 15 percent by weight solids of the treating composition.

9. The method as claimed in claim 7 in which the amount of the solids of the treating composition deposited in the base ranges from 15–35 percent by weight of the final product.

10. In the method of treating a porous base of inorganic fibers bonded with an organic resinous material for use under high temperature conditions comprising impregnating the porous base with a composition the solids of which comprise silicic acid and the condensation reaction product of urea, boric acid and a polyhydric alcohol, and baking the impregnated porous base by heating to a temperature within the range of 400–700° F. after the liquids of the treating composition have been eliminated to react the materials into an inorganic binder.

11. In the method of treating a porous base of glass fibers bonded with a phenol-formaldehyde resin for use under high temperature conditions without punking, the step of impregnating the porous base with a composition containing the condensation reaction product of urea, boric acid, and a polyhydric alcohol in amounts to deposit from 15–35 percent by weight.

12. A high tempearture insulation comprising inorganic fibers, an organic resinous binder securing the fibers one to another into a porous base and a composition on the organic resinous bonded glass fibers comprising a combination of silicic acid and an organic borate.

13. A high temperature insulation comprising inorganic fibers, an organic resinous binder securing the fibers one to another into a porous base and a composition on the organic resinous bonded glass fibers comprising the combination of silicic acid and the condensation reaction product of urea, boric acid and a polyhydric alcohol.

14. A high temperature insulation comprising inorganic fibers, an organic resinous binder securing the fibers one to another into a porous base and a composition on the organic resinous bonded glass fibers comprising a combination of silicic acid and an organic borate and in which the materials are present in the ratio of 1 part by weight silicic acid to 0.1–1.0 part by weight organic borate.

15. A high temperature insulation comprising inorganic fibers, an organic resinous binder securing the fibers one to another into a porous base and a composition on the organic resinous bonded glass fibers comprising the combination of silicic acid and the condensation reaction product of urea, boric acid and a polyhydric alcohol, and in which the combinations of materials are present in amounts in excess of 15 percent by weight of the finished product.

16. A high temperature insulation comprising inorganic fibers, an organic resinous binder securing the fibers one to another into a porous base and a composition on the organic resinous bonded glass fibers comprising the combination of a siliceous filler in finely divided form, silicic acid and the condensation reaction product of urea, boric acid and a polyhydric alcohol.

17. A high temperature insulation comprising glass fibers, an organic resinous material bonding the fibers one to another into a porous insulation base, and a composition on the bonded glass fibers comprising the combination of a siliceous filler in finely divided form, silicic acid and the condensation reaction product of urea, boric acid and a polyhydric alcohol, and in which the materials are present in the ratio of 1–4 parts by weight siliceous filler, 1 part by weight silicic acid and 0.1–1.0 part by weight of the urea borate.

18. A high temperature product as claimed in claim 17 in which the combination of materials is present in an amount ranging from 15–35 percent by weight of the final product.

19. An insulation product which resists punking at elevated temperatures comprising glass fibers, an organic resinous material bonding the fibers one to another and a material on the bonded glass fiber surfaces which increases the temperature of punking of the organic resinous binder, comprising the condensation reaction product of urea, boric acid and a polyhydric alcohol.

References Cited in the file of this patent

UNITED STATES PATENTS

| | | |
|---|---|---|
| 2,501,783 | Morgan | Mar. 28, 1950 |
| 2,526,684 | Powers et al. | Oct. 24, 1950 |
| 2,527,329 | Powers et al. | Oct. 24, 1950 |
| 2,593,817 | Waggoner | Apr. 22, 1952 |
| 2,630,410 | Clapsadle et al. | Mar. 3, 1953 |
| 2,703,486 | Ford | Mar. 8, 1955 |
| 2,723,210 | Biefeld | Nov. 8, 1955 |
| 2,754,224 | Caroselli | July 10, 1956 |